United States Patent [19]
Janata et al.

[11] Patent Number: 5,778,664
[45] Date of Patent: Jul. 14, 1998

[54] APPARATUS FOR PHOTOCATALYTIC DESTRUCTION OF INTERNAL COMBUSTION ENGINE EMISSIONS DURING COLD START

[75] Inventors: Jiri Janata; Gary L. McVay, both of Richland; Charles H. Peden, West Richland; Gregory J. Exarhos, Richland, all of Wash.

[73] Assignee: Battelle Memorial Institute, Richland, Wash.

[21] Appl. No.: 717,036

[22] Filed: Sep. 20, 1996

[51] Int. Cl.$^6$ .................. F01N 3/20; C07C 63/00; B01D 53/00; B01J 19/08
[52] U.S. Cl. .................. 60/274; 60/275; 60/301; 204/157.3; 204/158.2; 422/168; 422/186.3; 423/212
[58] Field of Search ................ 60/274, 275, 282, 60/301; 204/157.3, 157.15, 158.2; 422/168, 184.1, 186, 186.3; 423/211, 213.2, 213.5

[56] References Cited

U.S. PATENT DOCUMENTS

| | | | |
|---|---|---|---|
| 4,876,852 | 10/1989 | Abthoff et al. | 60/275 |
| 4,880,772 | 11/1989 | Pederson et al. | 505/446 |
| 5,174,877 | 12/1992 | Cooper et al. | 422/186.3 |
| 5,449,443 | 9/1995 | Jacoby et al. | 204/157.3 |
| 5,480,524 | 1/1996 | Oeste | 204/157.3 |

FOREIGN PATENT DOCUMENTS

| | | | |
|---|---|---|---|
| 4481945 | 11/1981 | France | 60/274 |
| 54312 | 3/1991 | Japan | 60/275 |

OTHER PUBLICATIONS

*Development and Opitimization of a $TiO_2$–Coated Fiber–Optic Cable Reactor: Photocatalytic degradation of 4–Chlorophenol*, NJ Peill and MR Hoffmann, Enfironmental Science & Tech./vol. 29, No. 12, 1995.

*Challenges in Emission Control Catalysis for the Next Decade*, BJ Cooper, Platinum Metals Rev., 38, (1), 2–10, Jan. 1994.

*Photochemistry on Nonreactive and Reactive (Semiconductor) Surfaces*, PV Kamat, Chem. Rev. 93, 267–300, Jan. 1993.

*Heterogeneous Photocatalysis*, MA Fox and MT Dulay, Chem. Rev. 93, 341–357, Jan. 1993.

*Environmental Applications of Semiconductor Photocatalysis*, Hoffmann et al., Chem. Rev. 95, 69–96, Jan. 1995.

*Primary Examiner*—Willis R. Wolfe
*Attorney, Agent, or Firm*—Douglas E. McKinley, Jr.

[57] ABSTRACT

A method and apparatus for the destruction of emissions from an internal combustion engine wherein a substrate coated with $TiO_2$ is exposed to a light source in the exhaust system of an internal combustion engine thereby catalyzing oxidation/reduction reactions between gaseous hydrocarbons, carbon monoxide, nitrogen oxides and oxygen in the exhaust of the internal combustion engine.

11 Claims, 3 Drawing Sheets

APPARATUS FOR PHOTOCATALYTIC DESTRUCTION OF INTERNAL COMBUSTION ENGINE EMISSIONS DURING COLD START

This invention was made with Government support under Contract DE-AC06-76RLO 1830 awarded by the U.S. Department of Energy. The Government has certain rights in the invention.

FIELD OF THE INVENTION

The present invention relates generally to a method and apparatus for photocatalytic destruction of emissions from internal combustion engines during cold start. More specifically, the present invention is the use of substrates coated with photocatalyst materials and exposed to ultraviolet light as catalysts for the oxidation of gaseous hydrocarbons, carbon monoxide, and for the reduction of nitrogen oxides in the exhaust systems of internal combustion engines.

BACKGROUND OF THE INVENTION

Internal combustion engines, especially automobile engines, are one of the principal sources of airborne pollutants. Gaseous hydrocarbons, carbon monoxide, and nitrogen oxides contained in the exhaust are among the major atmospheric pollutants created by internal combustion engines. Several schemes have been developed to reduce or eliminate these pollutants, however, to date none of these solutions have been entirely satisfactory. In response to the persistent presence of these pollutants, current regulatory structures have arisen which require emission levels unattainable using schemes currently installed into internal combustion engines, principally in automobiles.

To date, the primary technique for reduction of pollutants involves the use of catalytic converters devised to react with the pollutants and prevent their release into the atmosphere. Catalytic converters are chambers containing catalytic materials such as palladium or platinum which facilitate oxidation/reduction reactions between the pollutants and oxygen present in air in the exhaust gas to convert the pollutants into benign gasses such as $CO_2$ and water.

Typically, catalytic converters require high temperatures to function at optimal levels and effectively catalyze the desired reactions. In many instances, temperatures of the catalytic converters are raised to optimal or effective levels by exposing the catalytic materials to hot exhaust gasses. At the initial start up of an internal combustion engine, these catalytic materials have not yet been raised to temperatures optimal for reaction and destruction of these pollutants. Until the temperatures of these catalytic materials are raised by exposure to the exhaust gasses, these pollutants pass through the catalytic converters without the catalytic material catalyzing the desired reactions and the pollutants are released into the atmosphere.

Also, at the initial start up of internal combustion engines, engine temperatures are lower. This low engine temperature typically results in incomplete combustion of hydrocarbon fuels leading to relatively high levels of hydrocarbon pollutants in the exhaust.

Thus, there exists a need for a method of destroying gaseous pollutants emitted from internal combustion engines at lower temperatures.

SUMMARY OF THE INVENTION

The destruction of gaseous pollutants emitted from internal combustion engines is accomplished through the photocatalytic reaction of the pollutants with substrates coated with photocatalytic materials. As contemplated by the present invention, photocatalytic materials are defined as transition metal oxides which may include additional dopants. Transition metal oxides useful as photocatalytic materials would include, but not be limited to, $TiO_2$, $SnO_2$, or ZnO. Dopants used in the photocatalytic materials would include, but not be limited to, one or more promoter species including the noble metals, such as Pt and Pd; semiconductor materials such as CDs, $RuO_2$, SnQ, ZnO, ZrO, or other sensitizer molecules which expand the photoresponse of the transition metal oxide such as phenylfluorene, squaranes, anthracene-9-carboxylic acid, or combinations thereof. Photocatalytic oxidation of the pollutants takes place when the pollutants and oxygen are brought into contact with photocatalytic materials which are activated by light. The oxygen source can be any oxygen source, however, it is convenient to simply use oxygen present as dioxygen molecules or water vapor molecules that are present in the exhaust gas, having been drawn from the atmosphere and directed through the engine, or nitrogen oxides created during combustion. Upon exposure to light of a suitable energy level, photocatalytic materials form separated electron/hole pairs which will catalyze the desired oxidation/reduction reactions between gaseous hydrocarbons, carbon monoxide, nitrogen oxides, and oxygen.

The photon energy required for the formation of such electron hole pairs is dependent upon the material. For example, substrates coated with $TiO_2$ form the desired electron/hole pairs when exposed to light having energies greater than about 3 electron volts, while substrates coated with a mixture of CDs and $TiO_2$ form the desired electron/hole pairs when exposed to light having energy greater than about 2.5 electron volts.

Typically, oxygen is present in the air which is not consumed by combustion and passes through the internal combustion engine into the exhaust. By placing the photocatalytic materials in a chamber in the exhaust system of the internal combustion engines, and exposing them to light sources suitable for forming the desired electron/hole pairs, contact between the exhaust gasses, oxygen, and the photocatalytic materials takes place resulting in the desired oxidation/reduction reactions that lead to the elimination or a decrease in the output of the uncombusted gaseous hydrocarbons, carbon monoxide, and nitrogen oxides resulting from the operation of the internal combustion engine. The photocatalytic materials are thus placed in a chamber in the exhaust stream of an internal combustion engine and are brought into contact with light having an energy suitable for formation of the desired electron/hole pairs.

Light may be directed onto the photocatalytic materials by direct illumination, in which case the light source would be placed inside the photocatalytic chamber. Alternatively, light may be delivered to the photocatalytic materials via light conduits such as solid or hollow optical fibers. Directing the light to the photocatalytic materials via light conduits allows the light source to be located external to the chamber. The light is introduced into the conduits at a location external to the chamber, the conduits then extend into the chamber, whereupon the light is guided through the conduits to the interior of the chamber. Within the chamber, the light conduits are coated with photocatalytic materials, whereupon the light may activate the photocatalytic materials and thus photocatalyze the desired reactions.

Light introduced to the conduits is guided into the chamber by internal reflection of the light within the conduit. Once the light has reached the portion of the conduit coated with the photocatalytic materials at the interior of the chamber, there are two possible modes in which the light may interact with the photocatalyst. In the first mode, a fraction of the light energy penetrates outside of the conduit at the points where internal reflection occurs. This penetration creates a so called evanescent field. By coating the conduit with the photocatalytic material, the photocatalytic material is thereby placed in such an evanescent field and thus absorbs the light of the appropriate energy as it would in a normal transmission/absorption mode. Light may also be delivered to the photocatalytic materials via the conduits by light scattering. In the case of light scattering, the internally reflected light encounters deliberately created scattering centers formed within the conduit, whereupon the light is spherically scattered. A sufficient fraction of this scattered light penetrates into the photocatalytic materials and thereby activates the catalyst.

There is a difference in the amount of light which is lost from the conduit depending on whether light is delivered to the photocatalytic materials via light scattering or through the use of evanescent fields. Similarly, the evanescent mode of light delivery has a lower loss of light, but it may be less efficient in activating the catalyst. Thus, those skilled in the art will recognize that in the design of a particular apparatus for the photocatalytic destruction of internal combustion engine emissions, there are trade offs inherent in selecting whether light delivery to the photocatalytic materials is accomplished directly through light conduits by light scattering, or through the use of evanescent fields, or through some combination of the two.

For example, the use of evanescent fields may be useful if the light were to travel a longer distance or if the light traveling in the optical conduit is more rapidly attenuated. Alternatively, the use of light scattering may be desired if the particular design requires greater efficiency in activating the catalysts. In such a case, a light scattering mode may be preferable for a parallel arrangement of a bundle of light conduits.

One additional consideration involves specification of the photocatalytic oxide coating thickness. The proper functioning of the fiber optic delivery system depends upon the thickness of the photocatalytic coating and its complex refractive index. A glass fiber acting as a waveguide usually is coated with a cladding material of lower refractive index so as to constrain the light to the fiber thereby increasing the propagation distance along the fiber. However, if the cladding material is of a higher refractive index than the glass, for example if a photocatalyst such as titanium dioxide were used as a cladding material on a substrate such as silica glass, light will propagate only a short distance down the fiber before it is directed axially out from the fiber. In such a case, the fiber is described as very lossy. Increased propagation distances for high index coatings, such as photocatalysts, on low index waveguides, such as silica glass, may thus only be realized when the coating thickness is less than the wavelength of light being propagated through the fiber. In that case, the glass fiber will still be lossy, but the light will propagate over greater distances before being fully attenuated. It is therefore preferred for the present invention that the maximum coating thickness be less than 500 nm. In addition, light from the fiber, upon entering the photocatalytic material, must also travel to the outer surface of the photocatalyst where photocatalytic reactions occur. The minimum coating thickness is determined by the imaginary part of the refractive index of the coating material referred to as the extinction coefficient. Thus, it is preferred that the photocatalyst have a minimum thickness of 5 nm.

OBJECTS

It is therefore an object of the invention in one of its embodiments to provide a substrate coated with a photocatalytic material in the exhaust system of an internal combustion engine.

It is a further object of the invention to provide a transition metal oxide as the photocatalytic material. It is a further object of the invention to provide the transition metal oxide photocatalytic material as $TiO_2$, $SnO_2$, or $ZnO$.

It is a further object of the invention to provide the photocatalytic material with dopants selected as one or more promoter species including the noble metals, such as Pt and Pd; semiconductor materials such as CDs, $RuO_2$, $SnO_2$, $ZnO$, $ZrO_2$; other sensitizer molecules which expand the photoresponse of the transition metal oxide such as phenylfluorone, squaranes, anthracene-9-carboxylic acid, or combinations thereof.

It is a further object of the invention to expose the photocatalytic material to a light source of a suitable photon energy to activate the photocatalytic properties of the photocatalytic material.

It is a further object of the invention to bring the photocatalytic material exposed to a light source into contact with the exhaust of the internal combustion engine, thereby catalyzing oxidation/reduction reactions between gaseous hydrocarbons, carbon monoxide, nitrogen oxides and oxygen to reduce or eliminate the expulsion of gaseous hydrocarbons, carbon monoxide, and nitrogen oxides into the atmosphere.

It is a further object of the invention to provide the photocatalytic material as a coating on a light conduit, and to direct a light source of a suitable photon energy into the conduit thereby directing the light to the photocatalytic materials and activating the photocatalytic properties of the photocatalytic material.

It is a further object of the invention to direct the light to the photocatalytic materials through light scattering or the use of evanescent fields, or a combination of both.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

In a first preferred embodiment of the present invention, a substrate material is coated with a photocatalytic material consisting essentially of titanium dioxide (TiO$_2$). This photocatalytic material is then placed in the exhaust stream of an internal combustion engine where it is exposed to ultraviolet light. As exhaust from the internal combustion engine contacts the catalysts, gaseous hydrocarbons and carbon monoxide are oxidized and nitrogen oxides are reduced.

Figure 1:
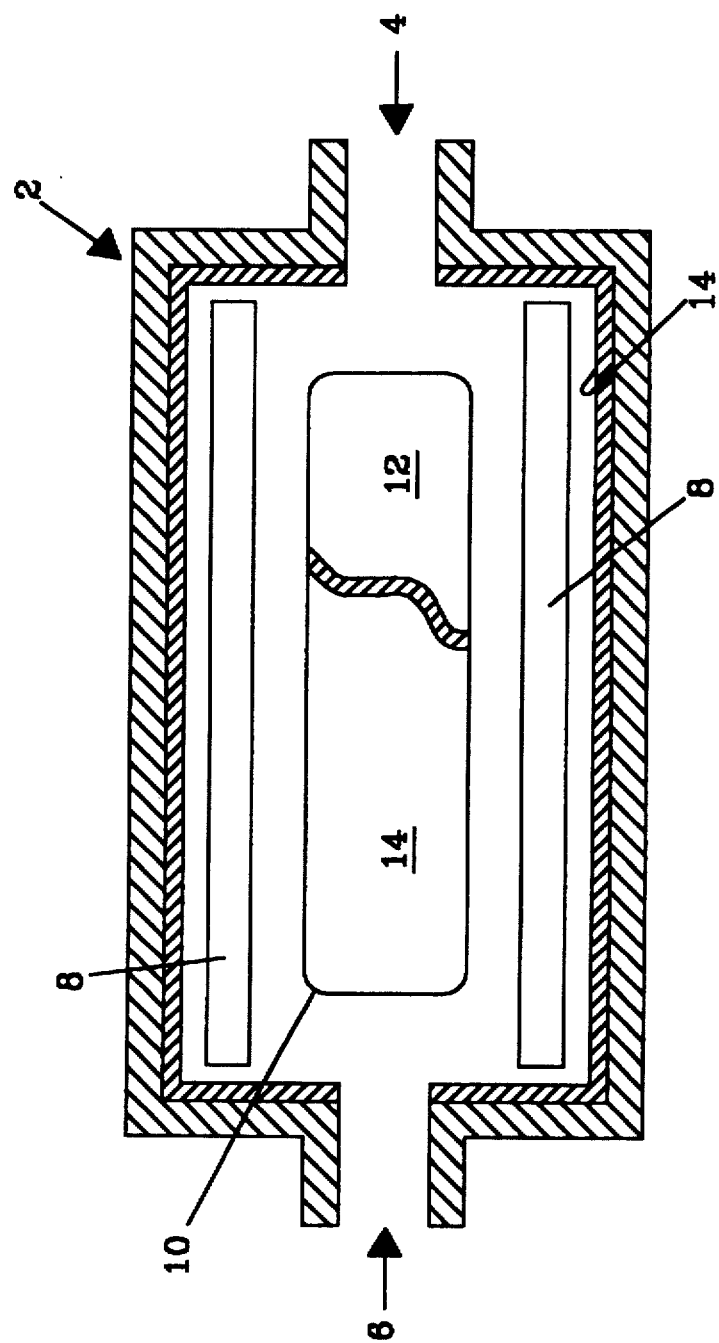
FIG. 1 is a schematic view of the first preferred embodiment.

FIG. 1 is a schematic drawing of the first preferred embodiment of the present invention. A chamber 2 is provided in line with the exhaust system of an internal combustion engine having a gas inlet 4 where exhaust gasses from the engine enter the chamber, a gas outlet 6 where gasses exit the chamber. In the interior of the chamber 2, one or more light sources 8, and a packing material 10 are provided. The packing material is comprised of a substrate 12 coated with photocatalytic material 14 containing TiO$_2$. In addition, the interior walls of the chamber are also coated with photocatalytic material 14 containing TiO$_2$. Any coating method suitable for applying the photocatalytic material to the packing material and chamber interior walls may be employed, however, it is preferred that a solution based technique such as the sol-gel process or the glycine-nitrate process disclosed in U.S. Pat. No. 4,880,772 to Pederson et. al. entitled PREPARATION OF THIN CERAMIC FILMS VIA AN AQUEOUS SOLUTION ROUTE and incorporated herein by reference be employed. Exhaust from the internal combustion engine is directed through the chamber 2 whereupon it contacts the photocatalytic materials 14. Simultaneously, light from the light source 8 activates the photocatalytic materials 14, thereupon initiating photocatalytic oxidation and reduction reactions wherein gaseous hydrocarbons and carbon monoxide are oxidized and nitrogen oxides are reduced. Thus, as will be apparent to those skilled in the art, any configuration of the packing material may be selected, however, to maximize the opportunity for photocatalytic oxidation and reduction reactions, the surface area of activated photocatalytic material should be maximized and the possible pathways for exhaust through the chamber without contacting the activated photocatalytic materials should be minimized. Thus, as will be apparent to those skilled in the art, the packing material 10 as illustrated in FIG. 1 is merely provided as illustrative of the relative position of the packing material within the chamber 2, and is not intended to illustrate all possible, or even the most advantageous configurations, of the packing material 10 which could and would be selected by those skilled in the art to maximize the surface area available for the desired reactions.

Figure 2:
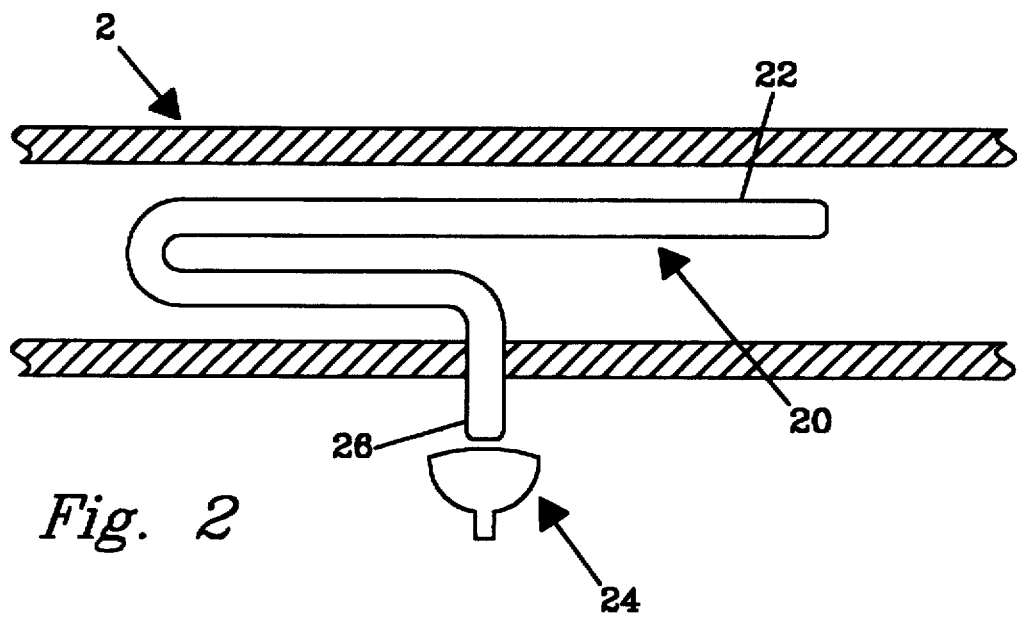
FIG. 2 is a schematic view of the second preferred embodiment.
Figure 2A:
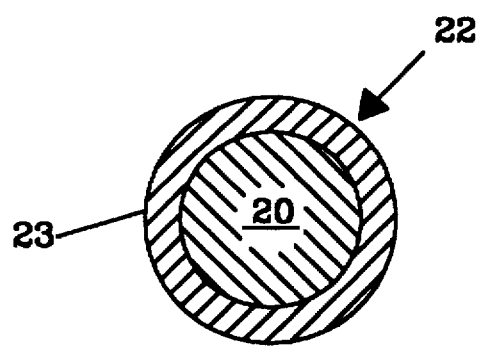
FIG. 2a is a cut away view of a cross section of a fiber coated with $TiO_2$ as used the second preferred embodiment.

A second preferred embodiment of the present invention is illustrated in FIG. 2. A light transmissive material, preferably a quartz optical fiber 20, is provided as a substrate material. The fiber may be either solid or hollow. A first end 22 of the substrate is coated with a photocatalytic material containing TiO$_2$ 23 as illustrated in the cross sectional view of the first end 22 in FIG. 2a. The fiber passes through the housing 2 of the exhaust system of an internal combustion engine so that the first end 22 of the fiber coated with the photocatalytic material is on the interior of the exhaust system and is thus in contact with exhaust gasses present in the exhaust system during operation. Light from a light source 24 of suitable photon energy to activate the photocatalytic properties of the photocatalyst is directed into the second end 26 of the fiber which is external to the exhaust system. Light from the light source 24 activates the photocatalytic materials. The second end, 26, in between the light source 24 and the housing 2, is coated with a material suitable for containing light within the fiber, to insure the maximum amount of light is directed from the light source 24 to the first end 22 coated with the photocatalytic material 23. As exhaust from the internal combustion engine contacts the photocatalytic material 23 excited by the light source 24, gaseous hydrocarbons and carbon monoxide contained in the exhaust are catalytically oxidized and nitrogen oxides are catalytically reduced. While FIG. 2 shows a single bend in the first end 22, as will be apparent to those skilled in the art, it is desirable to provide the maximum opportunity for exhaust gasses to contact with the photocatalytic material 23 on the first end 22, and an infinite variety of configurations of the first end 22 are thus possible depending on the particular shape of the housing 2. Similarly, as will be apparent to those skilled in the art, several optical fibers may be used simultaneously, in series or in parallel, to provide the maximum opportunity for exhaust gasses to contact with the photocatalytic materials.

EXPERIMENT

An experiment was performed to demonstrate the photocatalytic oxidation/reduction of the target gasses. The exhaust stream of an internal combustion engine was modeled by a simple propylene/air mixture. Specifically, the test gas contained 300 ppm propylene (C$_3$H$_6$) in dry, carbon dioxide free air. This particular hydrocarbon and its concentration is considered to be prototypical for an exhaust composition from an internal combustion engine. The flow of this gas mixture was directed through a photocatalytic reactor at a rate controlled by a mass flow controller. The photocatalytic reactor was illuminated with a low power 50 watt UV light. The photocatalytic reaction chamber consisted of quartz capillary tubes coated with titania assembled in a ⅛" quartz tube and connected to the gas flow system. Quartz was selected as the material for both the substrate to support the photocatalytic material, TiO$_2$, and the reactor chamber, because it is transparent to UV light with photon energies of about 3 eV necessary to create electron/hole pairs in titanium dioxide semiconductors. The capillaries were coated both inside and outside with a titania film by a sol-gel process to ensure the maximum contact area of the catalyst. The sol-gel processing solution was prepared by mixing titanium ethoxide and absolute ethanol which had been supersaturated with dry HCl gas. Following addition of concentrated HCl, the reagent concentrations were found to be 0.728M in Ti(IV), 12.9M in H$_2$O, and 4.7M in HCl. A dip coating method was used to apply coatings to glass substrates. The relatively low pH (below about 1) of the solution was found to produce dense, hard coatings having a refractive index of about 2.24 following thermal processing to 400° C. Coatings were strongly adherent to the glass surfaces. Raman spectra of the thermally treated materials confirmed that the films were anatase TiO$_2$. Gas samples exiting the reactor were analyzed by using a gas chromatograph (GC) equipped with a thermal conductivity detector, and Porapak Q and molecular sieve packed columns.

Figure 3:
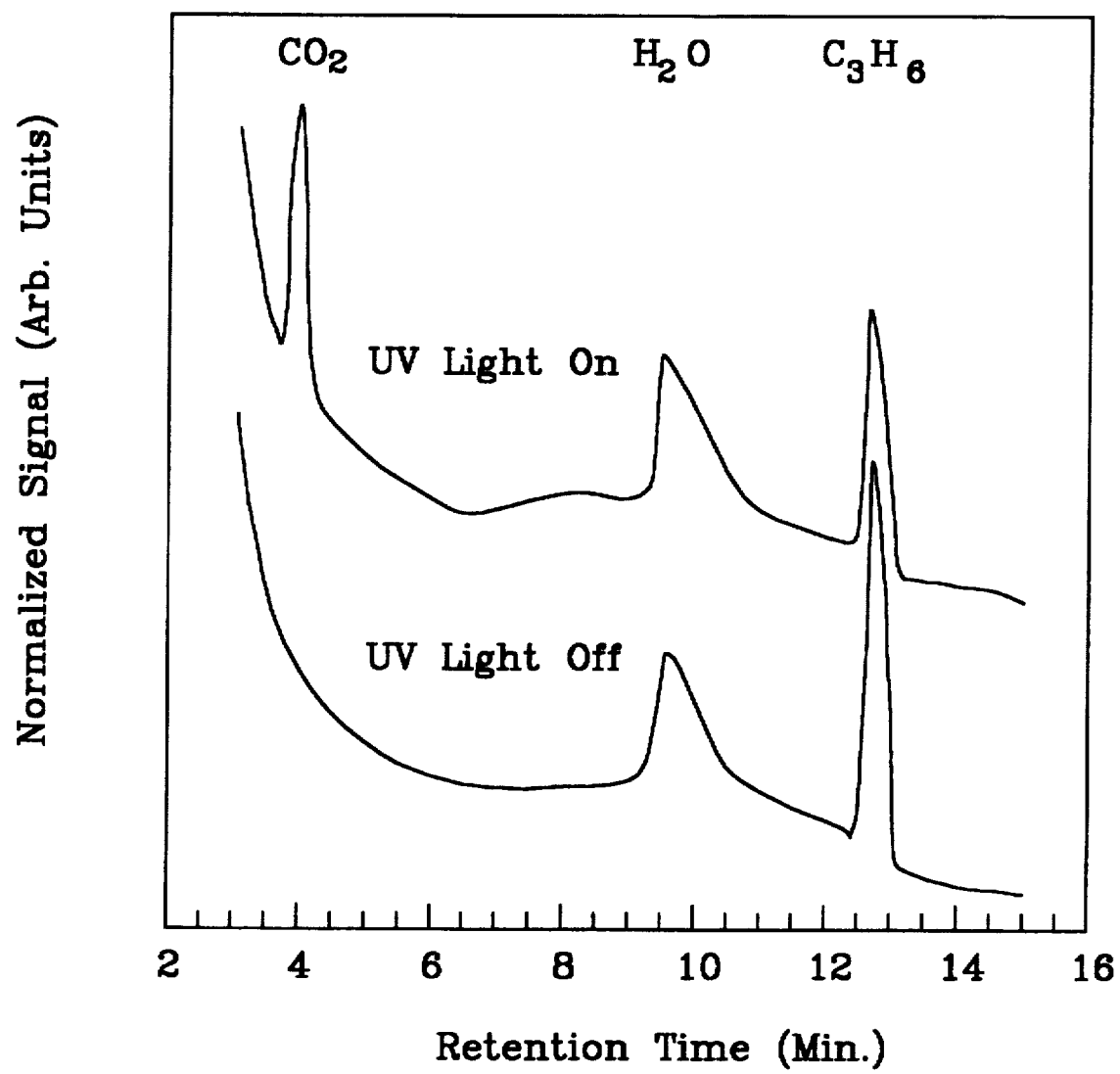
FIG. 3 is a gas chromatograms taken of a propylene/air mixture with and without light stimulation of the photocatalyst showing the resultant photocatalytic destruction of the propylene and formation of the benign gasses, carbon dioxide and water.

In the absence of UV illumination, no reaction was observed. However, a GC peak corresponding to the product of reaction, carbon dioxide, was present upon irradiation. The lower curve of FIG. 3 is a gas chromatogram taken of the propylene/air mixture without UV illumination demonstrating no destruction of the propylene. The upper curve of FIG. 3 is a gas chromatogram taken of the propylene/air mixture after being passed over an illuminated catalyst showing a peak indicating the production of carbon dioxide demonstrating the photocatalytic destruction of the propylene. Concurrently a decrease in the GC peak corresponding to the reactant propylene is observed. Notably, no other reaction product from incomplete combustion, such as carbon monoxide or partially oxidized hydrocarbon species, are observed. Thus, the overall reaction proceeds according to equation:

$$C_3H_6 + 9/2 O_2 \rightarrow 3CO_2 + 3H_2O$$

The appearance of carbon dioxide and the decrease in propylene were shown to depend on the flow rate of the propylene/air mixture or residence time in the reactor.

Photocatalytic propylene oxidation activity was observed to be remarkably stable over time demonstrating the photostability of the catalyst. In particular, experiments carried out for times >24 hours showed no change in the reaction rate. The same set of titania-coated capillary tubes were used repeatedly for over a year under a variety of reaction conditions without any loss in activity.

Another important consideration is the effect of water vapor on the photocatalytic reactivity of titania because of the potential for relatively high concentrations of water in automobile exhaust, particularly in high humidity climates. It has also been reported that while the presence of water in the reactant gas mixture is critical for the gas-phase photocatalytic destruction of chlorohydrocarbons using titania, high water-vapor concentrations lead to catalyst deactivation; see G. B. Raupp and C. T. Junio, Appl. Surf. Sci. 72 (1993) 321. In the course of these experiments, the reactant gas mixture was purged of water by routing the gas through a liquid nitrogen trap to freeze any water present, and water was deliberately introduced into the gas by bubbling the gas through a water bath. The presence of water vapor was not critical for the photocatalytic destruction of propylene, nor did the water poison or deactivate the catalyst. These results demonstrate that the catalyst does not deactivate over time, and that the propylene conversion rates are insensitive to atmospheric water vapor even at relatively high concentrations.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for the destruction of emissions from an internal combustion engine comprising a chamber in line with the exhaust system of said internal combustion engine, said chamber containing a photocatalyst and a light source in communication with said photocatalyst.

2. The apparatus of claim 1 wherein the photocatalyst material is a transition metal oxides selected from the group comprising $TiO_2$, $SnO_2$, ZnO or combinations thereof.

3. The apparatus of claim 2 wherein the photocatalyst material is combined with a species selected from the group consisting promoter species including the noble metals, Pt and Pd; semiconductor materials, including CDs, $RuO_2$, $SnO_2$, ZnO, $ZrO_2$, photosensitizer materials, including phenylfluorone, squaranes, anthracene-9-carboxylic acid, and combinations thereof.

4. An apparatus for the destruction of emissions from an internal combustion engine comprising a chamber in line with the exhaust system of said internal combustion engine, said chamber containing at least one light conduit coated with a photocatalyst, and a light source in communication with said photocatalyst.

5. The apparatus of claim 4 wherein the photocatalyst material is a transition metal oxides selected from the group comprising $TiO_2$, $SnO_2$, ZnO or combinations thereof.

6. The apparatus of claim 5 wherein the photocatalyst material is combined with a species selected from the group consisting promoter species including the noble metals, Pt and Pd; semiconductor materials, including CDs, $RuO_2$, $SnO_2$, ZnO, $ZrO_2$, photosensitizer materials, including phenylfluorone, squaranes, anthracene-9-carboxylic acid, and combinations thereof.

7. The apparatus of claim 4 wherein the light conduits are selected from the group consisting of optical fibers, hollow optical fibers, or combinations thereof.

8. The apparatus of claim 4 wherein the light source is located on the exterior of the chamber, the light conduits extend from the light source through the chamber, at least a portion of the light conduits internal to the chamber are coated with the photocatalytic material, and the light source communicates with the photocatalytic material by directing light through the light conduits to the photocatalytic materials on the interior of the chamber.

9. The apparatus of claim 7 wherein the communication between the light and the photocatalytic materials occurs in the evanescent field.

10. The apparatus of claim 7 wherein the communication between the light and the photocatalytic materials is by light scattering.

11. A method for catalyzing oxidation/reduction reactions between gaseous hydrocarbons, carbon monoxide, nitrogen oxides and oxygen in the exhaust of an internal combustion engine comprising the steps of:

a) placing a photocatalytic material comprising a substrate coated with a transition metal oxides selected from the group comprising $TiO_2$, $SnO_2$, ZnO or combinations thereof in the exhaust system of an internal combustion engine, b) exposing said photocatalytic material to a light source, c) bringing said photocatalytic material exposed to said light source into contact with said exhaust of a said internal combustion engine, thereby catalyzing oxidation/reduction reactions between gaseous hydrocarbons, carbon monoxide, nitrogen oxides and oxygen present in said exhaust.

* * * * *